July 27, 1954 — H. J. WOLLNER ET AL — 2,684,595
DETERGENT METER
Filed Feb. 21, 1951
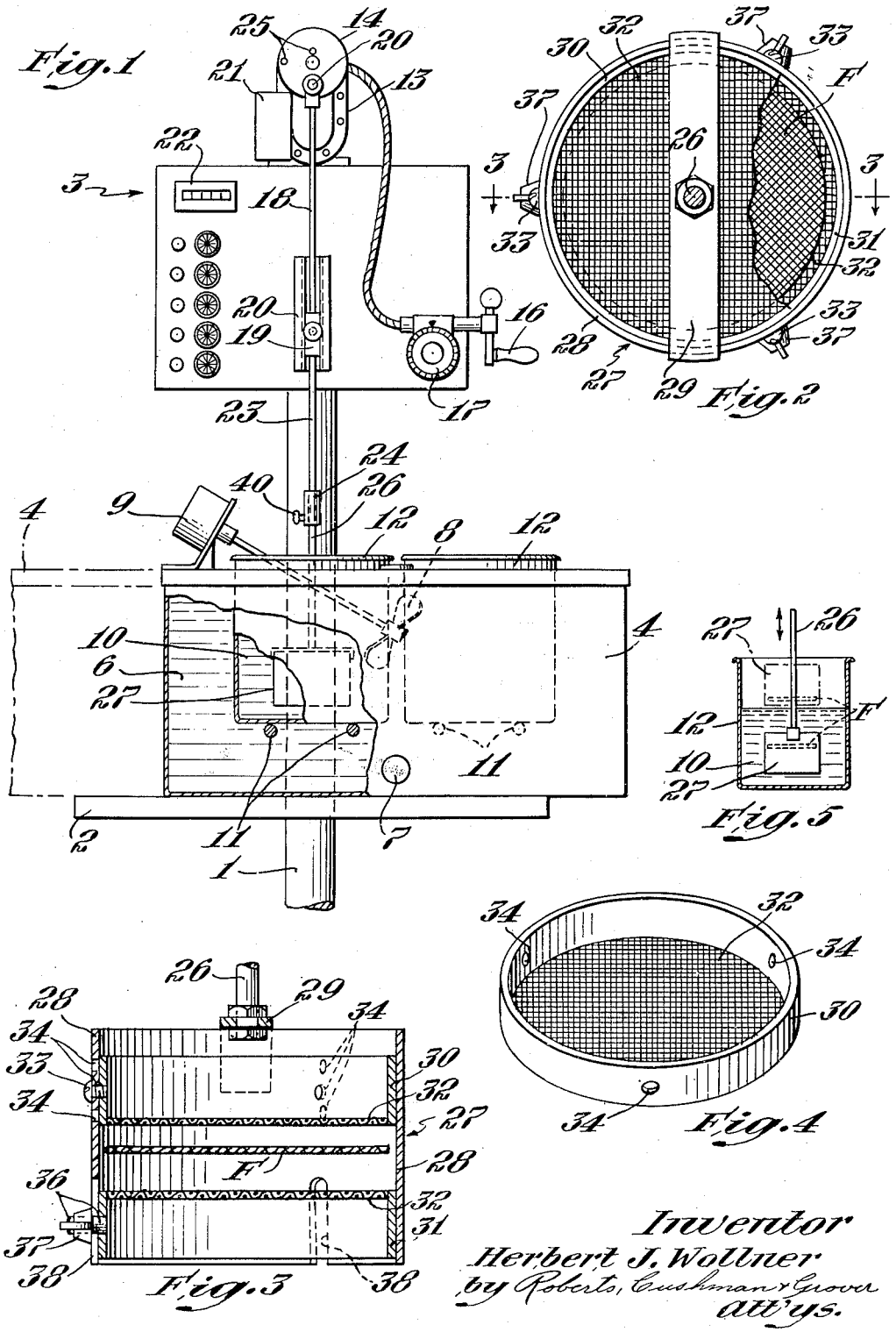
Inventor
Herbert J. Wollner
by Roberts, Cushman & Grover
att'ys.

Patented July 27, 1954

2,684,595

UNITED STATES PATENT OFFICE 2,684,595

DETERGENT METER

Herbert J. Wollner and George S. Freeman, Boston, Mass., assignors to American Conditioning House, Inc., Boston, Mass., a corporation of Massachusetts Application February 21, 1951, Serial No. 212,053

2 Claims. (Cl. 73—432)

This invention relates to apparatus for testing or measuring the cleaning effect of soaps or other detergents on fabrics, and particularly to a test apparatus and method which reproduces the effect of commercial laundering machines on a small scale employing small pieces of fabric.

In the art of commercial laundering it is necessary to have a way of testing and measuring the effects of soaps, detergents, bleaches and dry cleaner on textiles or other materials for the purpose of guiding the producers of laundering machinery and detergents in development of their products. It is also necessary for the launderers and dry cleaners to have some data which will predict the effect of the various detergents as used in various machines so that they may avoid damage to the articles which they clean. While it is possible to test the effect of each cleaner in each different type of washing machine, because of the diversity of materials which are cleaned it is impractical to do so. Furthermore the effect of detergents vary with the machine with which they are used, and since the effect of the different machines cannot be easily correlated, it is inconvenient and impractical to assemble the large number of commercial machines for the purpose of testing a new detergent. It is therefore highly desirable to provide small scale laboratory equipment which may be used to reproduce the effect of the various commercial machines.

At one time small scale tests were carried out by soaking soiled fabric in a beaker containing a solution of the detergent to be tested. Such tests of course did not produce the mechanical action of a commercial washing machine and attempts have been made to simulate such action by agitating a number of small pieces of fabric in beakers or the like under controlled conditions of temperature. Previous machines have agitated the solution by shaking closed beakers bodily or by stirring the solution in a beaker with a vane. In previous testing methods requiring the agitation of a large mass of folded fabric pieces, the several pieces of fabric are not cleaned to the same extent. It thus has been necessary to examine each piece of tested fabric carefully to determine the amount of cleaning and then to take an average of the cleaning effect on each of the several pieces of fabric. In addition to the time consuming nature of each an examination there is the disadvantage that each piece of fabric is not uniformly cleaned so that an estimate of the total cleaning effect of each piece of fabric must be made. A further disadvantage of previous methods has been that the dynamic conditions under which the detergent solution was agitated could not be accurately controlled. Thus unless an average of several test runs was made the conditions could not be accurately reproduced. A more serious objection is that previous detergent meters do not provide for raising the fabric out of the detergent solution which is a characteristic of most laundering operations.

One object of the present invention is to provide a way in which presoiled fabric may be cleaned uniformly under small scale laboratory conditions which may be accurately reproduced and which closely duplicate the actual conditions in a given commercial laundering machine. A further object is to provide a wide range of dynamic conditions.

A specific object is to provide a test operation which raises the fabric to be tested out of the liquid. Another particular object is to simplify the cleaning tests so that examination of the sample of presoiled fabric may be easily examined.

In an aspect the single sheet of soiled fabric is passed back and forth between opposed flat surfaces which permit the free passage of fluid therethrough thereby to subject the sheet to a series of impacts while constantly supplying unexhausted detergent solution to the surfaces of the fabric.

In a further aspect the invention relates to apparatus for testing the cleaning effect of a detergent and comprises a container for a solution of the detergent, extending into the container a cage, means for imparting a reciprocating stroke to the cage, said cage having a pair of spaced screens disposed transversely of said stroke alternately to engage the sheet of fabric flatwise and between said screens cylindrical walls disposed parallel to the stroke to restrict radial movement of the disk and confine it within the cage while permitting the sheet to rotate. Preferably the screens are separately attached to the cylindrical walls to permit adjustment of the spacing between the screens and the length and frequency of the stroke are adjustable thereby providing variable combinations of dynamic conditions. Since the stroke of the cage is straight it may be alternately disposed in and lifted out of a solution of the detergent whose cleaning effect is measured.

In a specific aspect separate means are provided for measuring the spacing between screens, the length, frequency and number of reciprocations of the cage.

For the purpose of illustration a typical embodiment of the invention is illustrated in the accompanying drawings in which Fig. 1 is a front elevation of apparatus for testing a detergent;

Fig. 2 is a plan view of a cage;

Fig. 3 is a section on line 3—3 of Fig. 2;

Fig. 4 is an isometric view of a part of the cage; and

Fig. 5 is a diagrammatic view illustrating the method of practising the invention.

As is indicated in Fig. 5 the fabric disk F may be lifted out of the detergent solution 10 in a way which simulates the action of a commercial laundering machine. The removal of the fabric from the solution occurs during the reciprocation cycle of the fabric, and produces a more vigorous rinsing and circulation of solution than if the fabric is kept in the solution. However for certain tests, such as with dry cleaners, or to simulate the action of other laundering machines, the method may be carried out entirely in the detergent solution.

One embodiment of the apparatus illustrated in the drawing comprises a suitably supported standard 1 on which is carried a platform 2 and control mechanism 3. Resting on the platform 2 is a tank 4 containing any suitable liquid such as water 6 which is maintained at a constant temperature by a thermostatically controlled heating device 7. Impeller blades 8 driven by a motor 9 constantly circulate the water bath 6 in the tank 4. Suspended in the tank and resting on bars 11 disposed transversely of the tank are two vessels 12 for holding a solution 10 of the detergent to be tested. The solution of detergent 10 is maintained at a constant temperature by the water bath 6. The tank 4 may be shifted between the positions shown in solid lines to the position shown in broken lines to bring either of the vessels 12 under the control apparatus 3.

The control apparatus 3 includes a motor driven gear reduction box 13 for driving a wheel 14 which in turn causes a cage 27 to be reciprocated in one of the vessels 12. A hand crank 16 permits adjustment of the gear box so that the speed at which the wheel 14 rotates is continuously variable. Each revolution of the wheel 14 closes a microswitch 21 which in turn electrically actuates a counting device 22. Associated with the hand crank 16 is an indicating dial 17 which shows the adjustment of the gear box. A connecting rod 18 is attached to the wheel 14 by a bearing 20 which may be attached in one of three sockets 25 disposed at various radii of the wheel. The connecting rod drives a block 19 sliding in a track 20. Attached to the block 19 is a reciprocating shaft 23 having at its lower end a collar 24 and thumbscrew 40 for receiving and clamping an extension rod 26. The extension rod 26 is mounted on the cage 27.

As shown in Figs. 2 to 4 the cage 27 comprises the tubular wall 28 to which the extension shaft 26 is attached by a strap 29. Attached within the tubular wall 28 are upper and lower rings 30 and 31 carrying disk-shaped screens 32. The screens are welded or soldered flush with the edges of the rings. The upper ring 30 may be mounted in one of three positions by passing one of the mounting screws 33 through one of a set of vertically spaced holes 34 in the cylinder walls 28. The lower ring 31 is attached to the wall 28 by sliding bolts 36 which are anchored in the sleeve 31 into slots 38 and tightening the wing nut 37 against the outside of the walls 29. The lower ring 31 may be easily removed by loosening the wing nuts 37 to facilitate the disposition of a disk-shaped piece of fabric F, between the screens. Preferably the disk has a diameter sufficient to cover the screens 32.

Preparatory to operation of the apparatus the cage 27 is removed from one of the vessels 12 by loosening the thumbscrew 40 to free the rod 26 from the collar 24. The lower ring 31 is then removed after loosening the wing nuts 37 and a circular or disk-shaped piece of presoiled fabric F is disposed between the two screens 32. The shaft 26 is then attached in the collar 24 so that the cage 27 is held below or near the surface of the detergent solution 10 in one of the vessels 12. The cage may then be reciprocated wholly in the solution, or preferably in and out of the solution as indicated diagrammatically in Fig. 5, depending on the position of the platform 2 on the standard 1 and the level of detergent solution 10 in the vessel 12. The eccentricity of the bearing 20 is then determined by inserting the bearing in one of the three sockets 25 in the wheel 14, thereby selecting the length of a stroke of the rod 26. As previously mentioned the spacing between the screens 32 may be varied by adjusting either the upper ring 30 or the lower ring 31. As the wheel 14 is rotated the screens will alternately strike the fabric F, the amount of impact depending on the spacng between the screens 32 and the length of the stroke of the shaft 26 as well as the speed with which the wheel 14 rotates. For example, when the effect of a detergent is tested on a relatively delicate fabric such as rayon, which loses strength when wet, the force of impact is preferably low and hence the spacing and length of stroke are relatively high, while the frequency of the stroke as determined by the speed of the wheel 14 is relatively low. On the other hand when a coarse durable fabric such as dungaree is employed more forceful action is required and therefore the length of stroke is decreased and the frequency of reciprocation is increased. It should be understood that the spacing between the screens and the length of stroke are interdependent to the extent that if the spacing is made too great and the stroke too little the desired action of propelling the fabric disk F back and forth between the screens by impact is not achieved particularly if the frequency of reciprocation is high.

As the wheel 14 is rotated the cage is reciprocated up and down, so that the disk of fabric is impelled back and forth vertically between the screens. After an impact from one of the screens, for instance the lower screen, the fabric traverses flatwise through the solution by virtue of its momentum for a brief period before receiving a downward impact from the upper screens. As the disk is impelled back and forth there is a tendency for it to rotate slightly in a random fashion so that wires of the screening 32 do not strike the same areas of the fabric constantly.

The motion of the cage and fabric cause a circulation of the solution 10 in the vessel 12 such that, as the detergent effect of portions of the solution is reduced, the average detergent effect of the solution washing against the disk is reduced very slowly, and unexhausted solution is continuously recirculated to the surfaces of the fabric disk.

It should be understood that the present disclosure is for the purpose of illustration only and that this invention includes all modifications and equivalents which fall within the scope of the appended claims.

I claim:

1. For testing the effect of a solution on a sheet of fibrous material, apparatus comprising a container for the solution, in the container two opposed screens spaced apart a predetermined distance and adapted to receive a disk of fibrous material loosely therebetween, and means for conjointly moving the screens back and forth in a direction transverse of their planes through a stroke substantially greater than said distance, whereby a sheet placed between the screens parallel to the screens is impacted flatwise by the screens alternately from opposite sides.

2. For testing the cleaning effect of a detergent on a fabric disk, apparatus comprising a container for a solution of the detergent, in the container a cage and means for imparting a reciprocating stroke thereto, means for adjusting the length of stroke in a predetermined range, said cage having a pair of spaced screens disposed transversely of said stroke alternately to engage the disk flatwise, adjustable means for mounting the screens within a predetermined range of spacing, and between said screen a cylindrical wall disposed parallel to said stroke to restrict radial movement of the disk while permitting rotation thereof, whereby the disk is impelled transversely back and forth through the solution between the screens with its surfaces uniformly exposed to the action of the detergent solution, the ranges of said stroke and spacing being interrelated so that the sheet is impelled in free unsupported traverse.

References Cited in the file of this patent

UNITED STATES PATENTS

| Number | Name | Date |
|---|---|---|
| 661,514 | Gaillard | Nov. 13, 1900 |
| 926,776 | Simmans | July 6, 1909 |
| 1,709,012 | Gregg | Apr. 16, 1929 |
| 2,568,707 | Bernstein | Sept. 25, 1951 |